United States Patent [19]

McConnell

[11] Patent Number: 5,517,562
[45] Date of Patent: May 14, 1996

[54] METHOD AND SYSTEM FOR PROVIDING A DISTRIBUTED SERVICE NETWORK FOR TELECOMMUNICATIONS SERVICE PROVIDERS

[75] Inventor: Von K. McConnell, Leawood, Kans.

[73] Assignee: Independent Telecommunications Network, Inc., Overland Park, Kans.

[21] Appl. No.: 333,021

[22] Filed: Nov. 1, 1994

[51] Int. Cl.$^6$ .................................................. H04M 3/42
[52] U.S. Cl. ........................... 379/207; 379/268; 379/201
[58] Field of Search ............................... 379/221, 201, 379/207, 211, 212, 62, 67, 112, 268; 395/600

[56] References Cited

U.S. PATENT DOCUMENTS

| | | | |
|---|---|---|---|
| 5,008,929 | 4/1991 | Olsen et al. | 379/112 |
| 5,012,511 | 4/1991 | Hanle et al. | 379/201 |
| 5,089,954 | 2/1992 | Rago | 395/600 |
| 5,212,789 | 5/1993 | Rago | 395/600 |
| 5,239,577 | 8/1993 | Bates et al. | 379/212 |
| 5,241,580 | 8/1993 | Babson, III | 379/201 |
| 5,247,571 | 9/1993 | Kay et al. | 379/207 |
| 5,303,285 | 4/1994 | Kerihuel et al. | 379/62 |
| 5,323,452 | 6/1994 | Dickman et al. | 379/201 |
| 5,353,331 | 10/1994 | Emery et al. | 379/67 |
| 5,355,404 | 10/1994 | LeDuc et al. | 379/201 |

*Primary Examiner*—Jeffery Hofsass
*Assistant Examiner*—Scott Wolinsky
*Attorney, Agent, or Firm*—Litman, McMahon and Brown

[57] ABSTRACT

A system and method for providing custom telephone services to a network of independent Service Providers (SP's) includes a network Service Control Point (SCP) and an associated network Service Creation Environment (SCE) at the network level. A number of SP's have SCE terminals which are interfaced with the network SCE through a network file server. This allows the SP's to create custom services and also to access custom services via a common bulletin board of services maintained at the network SCE. Dedicated, distributed SCP's owned by participating SP's are linked to the network SCP via a high speed data link and use a common operating and application system which provides expanded call processing capabilities, monitoring and system redundancy for the distributed SCP's.

36 Claims, 4 Drawing Sheets

Fig.7

USER: 112
LOGON TIME: XXXXX

SERVICE CATALOG
- REMOTE CALL FOWARDING
- REPEAT CALL
- RETURN CALL
- SELECTIVE CALL ACCEPTANCE
- SELECTIVE CALL REJECTION
- SEQUENTIAL LOCATION RINGING
- SPEED DIALING
- SWITCHED REDIRECT
- TOLL SCREENING
- VIRTUAL FOREIGN EXCHANGE
- WARM LINE
- WORK-AT-HOME

☐ VIEW SERVICE DEFINITION
☐ VIEW SERVICE LOGIC
☐ CUSTOMIZE SERVICE LOGIC
☐ CREATE NEW SERVICE LOGIC
☐ ADD NEW SERVICE TO CATALOG

☐ RETURN TO MAIN MENU    ☐ HELP

Fig.8.

USER: 112
LOGON TIME: XXXXX

SERVICE INFORMATION

DEFINITION    SWITCHED REDIRECT
[text]

AVG END USER PROFILE
[text]

AVG END USER WILLINGNESS-TO-PAY
NRC: $180
RC: 5 PER LINE

ITN SERVICE RTU PRICE
PER CUSTOMER XXX (NRC)

ITN MAINTENANCE PRICE
ANNUAL CHARGE: $XXX (RC)

☐ VIEW SERVICE LOGIC

☐ RETURN TO MAIN MENU    ☐ HELP

METHOD AND SYSTEM FOR PROVIDING A DISTRIBUTED SERVICE NETWORK FOR TELECOMMUNICATIONS SERVICE PROVIDERS

BACKGROUND OF THE INVENTION

1. Field of the Invention

This invention is directed to a system and method for utilizing a network of independent telephone companies and other telecommunications service providers to provide centralized, custom subscriber services. More particularly, the network provides a distributed Service Creation Environment whereby participating companies can maintain their own service and subscriber databases and, for larger service providers, a distributed Service Control Point (SCP) system hubbed to the network SCP for redundancy and logistical support.

2. Description of the Related Art

Until the early 1980's, often the only intelligent computer in a telephone system was the Central Office switch (CO). If a service provider, such as an independent telephone company (ITC), wanted to provide its customers with a custom service, such as call waiting, call forwarding, etc. the user had to approach the Central Office Switch vendor for a customized switch. Such customization was extremely expensive, often costing upwards of one million dollars and taking three or more years to implement for a single custom service. Such expenses were justified, since, for a switch vendor to provide such a service, often as many as 20,000 lines or more of custom computer code needed to be integrated with literally millions of lines of code in the switch itself and then extensive testing was required. Needless to say, the demand for new services by ITC's and other service providers was somewhat limited.

In the early 1980's, the Bell companies developed the LIDB system, or Line Information Database for verifying credit card calls and 800 calls. The creation of this system was necessary because the explosion of telecommunications service had created approximately 16,000 Central Office switches in the United States. With the advent of credit card calling and 800 number service, the choice was between maintaining a separate database in each such switch for verifying credit cards, 800 numbers, etc., or providing a central database which was accessible for call credit verification from all of the switches. The LIDB system uses a Service Control Point (SCP) which is associated with and is accessible from each Central Office Switch by interrupting the call in process for a period of a few milliseconds and accessing the SCP via a Common Channel Inter-Office Signalling data link (CCIS). The SCP then queries the central LIDB database for credit verification. Once the caller's credit card, the 800 number destination, etc. is verified, the SCP sends a return message to the switch and the call proceeds normally and the caller is unaware of any interruption.

Building upon the centralized billing verification system of LIDB, the Regional Bell Operating Companies (RBOC's) also started investigating the possibility of expanding the LIDB database to include more sophisticated services which were not switch dependent. A series of iterations of the centralized service concept evolved, including IN-1 or Intelligent Network 1, IN-2, etc. until about 1988, when the need for government dictated services in the Federal Telephone System in the FTS 2000 project acted as a catalyst to cause the creation of the AIN or Advanced Intelligent Network by BellCore and the RBOC's. The AIN system took the SCP of the LIDB system and associated a Service Creation Environment or SCE with it, creating an ISCP or Integrated Service Control Point. With this system, each participating Central Office Service Switching Point Switch (SSP) could provide a large variety of customer services, including, e.g. "dial 0", 800 numbers, call forwarding, call waiting, automatic calling number identification, voice mail, etc. by recognizing a service "trigger" during call processing and querying the ISCP for the service information associated with the calling or called number.

One example of the efforts by the RBOC's and BellCore to provide enhanced services to businesses is taught in U.S. Pat. No. 5,247,571 (the '571 patent) to William Kay et al., and entitled "Area Wide Centrex". This patent is directed to a system for using AIN capabilities to extend Centrex-type services to businesses over a wide geographic area encompassing multiple CO's.

In a typical Centrex system, a business, such as a large corporation, is provided specialized calling services to standard telephone lines via a local CO. Such services may include intercom capabilities via 2 or 3 digit extension numbers, call transfer between different users in the business, call forwarding and speed dialling services, among others. With Centrex services provided by the local CO, businesses are spared the considerable expense of setting up and maintaining a Private Branch Exchange (PBX) or Private Automatic Branch Exchange (PABX) network, and any number of standard telephone lines can be associated with the business and provided with the Centrex features.

A problem with the Centrex concept was that a business which had multiple office locations served by different CO's could not be provided with common services encompassing telephone numbers in the various locations. With call forwarding, for example, in an existing Centrex system, one employee who receives a call can switch the call to a second employee's telephone by simply flashing the hookswitch and dialling the second employee's number if the second employee is served by the same CO. Where the second employee is located at an office served by another CO, such call forwarding was impossible.

The '571 patent addressed these problems by employing an SCP which was accessible from multiple CO's via multiple associated Signalling Transfer Points (STP's). With this arrangement, a central database could be maintained at the SCP and lines for a single business but served by multiple CO's could be associated for providing Centrex-type services throughout a wide geographic region (a "wide area"), e.g. the entire state of Virginia.

In the '571 patent and other, similar systems, a number of different triggers were provided for causing the CO to access the SCP, among which were (1) Off-hook Immediate, i.e. the SCP database is queried when the customer first lifts his receiver, for providing dial tone, for example; (2) Off-hook Delay, in which dial tone is provided by the CO but the SCP database is queried after the dialling of the destination number, e.g. 1-800 numbers, etc.; and (3) Dialled number sends to Terminating Trigger, in which an entire destination number is dialled by the subscriber but, when the call reaches a destination CO, a query is triggered which interrupts call processing and queries the SCP as to what the terminating switch is to do with the call, e.g. provide a terminating announcement, forward the call to another number, etc.

The system described in the '571 patent, and others like it, have been developed by the RBOC's and BellCore mainly for RBOC and RBOC associated CO's with a vertical marketing strategy in mind. In other words, the central network service providers wanted to monopolize the provision of services by requiring subscribing companies to access the AIN databases only through the SCP's owned by the networks. Furthermore, the RBOC's and other large service providers wanted to control the creation of services and therefore the charges associated therewith. Thus, in order to allow an independent telephone company (ITC) or other competitive access provider (CAP), such as an independent cellular telephone company, for example, to access the AIN services provided by the RBOC's and others, they must be equipped with a Class 5 switch with the built-in capability to access the AIN SCP's. These sophisticated Class 5 switches are very expensive, typically costing from $200,000 to several million dollars, depending upon the switch capacity. Such a financial burden is too great for many of the smaller ITC's.

Nevertheless, it is the desire of many ITC's and CAP's who are not associated with the RBOC's to provide enhanced customer services and thus to become Telecommunications service providers (SP's). Furthermore, with competition in the telecommunications industry ever increasing, many of these independent companies, even the larger ones already equipped with class 5 switches capable of accessing the RBOC provided services, do not wish to reveal privileged customer information to an RBOC or other large, potentially competitive switching network. With the RBOC network, revealing the customer database is a necessity.

There currently exists a network of ITC's and other, independent service providers, called the Independent Telecommunications Network (ITN). ITN already provides centralized LIDB and billing services to many independent service providers in the network. ITN wishes to provide centralized AIN-type services to its participating companies, but without adopting the vertical marketing strategy of the RBOC system and without compromising the integrity of the subscriber databases owned by the participating companies.

It is clear then, that a need exists for a system and method which would allow an existing network, such as ITN, to provide AIN-type subscriber services to its customers and thus allowing independent ITC's and CAP's and others within its network to become SP's, providing lucrative customer services to their subscribers. Such a system and method should also provide for independent creation of custom services by the participating SP's and allow each SP to establish and maintain their own service and customer databases, including independently creating custom services and establishing charges for each service.

SUMMARY OF THE INVENTION

In the practice of the present invention, a network, such as ITN, provides enhanced customer services to participating telecommunications service providers such as ITC's, CAP's, IXC's, Cellular Telephone companies and others (hereinafter referred to collectively simply as SP's). The provision of enhanced services is accomplished by using a distributed hub format with a centralized network SCP and SCE. The network SCE is linked to a file server to which are attached multiple SCE terminals located at the various SP's. Similarly, the network SCP can be linked to dedicated SCP's at the SP's in a hubbed arrangement.

Each participating SP has one of the SCE terminals which is linked to the network SCE file server via digital data link. Each distributed SCE terminal can be tailored with capabilities to meet the particular needs of the associated SP. For example, full service creation capabilities can be given to an SP by providing the SCE terminal as a full extension of the network SCE. With full extension capabilities, custom services can be created by the SP on the SCE terminal and uploaded to the network, or custom services can be downloaded from a common services bulletin board maintained at the network and reviewed, adopted or modified to fit the needs of the SP. The common bulletin board of services can include relevant marketing data, recommended pricing for services, advertising information, etc., which can all be accessed by any subscribing SP with full extension capabilities.

If the SP does not need or desire full extension capabilities, it can be provided an SCE terminal with an X-Window option. With this option, service features from services on the network bulletin board can be reviewed and selected for use by the associated SP. Finally, for SP's which need or desire only service data entry and data extraction capabilities, as for entering subscribers to be associated with a service, or for extracting service billing data, for example, an SCE terminal with a VT100 emulation capability allowing simple data field entry and retrieval can be provided.

Some of the larger participating ITC's are already equipped with a dedicated SCP. In providing enhanced customer services for such an ITC with its own SCP, the network SCP is hubbed to the ITC's SCP using a common operation and application system as provided by the network. In this manner, services can be created and accessed via the ITC's distributed SCP, but the network SCP can be used for redundancy and system monitoring.

OBJECTS AND ADVANTAGES OF THE INVENTION

The principle objects and advantages of the present invention include: to provide a method and system for giving improved custom subscriber service capabilities to independent telecommunications service providers (SP's) participating in a network; to provide such an apparatus and method in which the network includes a centrally located SCP with an associated SCE; to provide such a system and method in which each participating SP is provided with an SCE terminal which is linked to the network SCE via a digital data link and a network file server to form a distributed service creation environment; to provide such a system and method in which SP's participating in the distributed SCE can access a network service bulletin board of custom services created by the network, others of the participating SP's and/or third party vendors; to provide such a system and method in which a distributed system of dedicated SCP's belonging to participating SP's are hubbed to the central network SCP via high speed data links for redundancy and monitoring support; to provide such a system and method in which the distributed SCP system utilizes a system of parallel processors at the network SCP, with each distributed SCP comprising a server linked to the network SCP via a high speed bus and using a common operating and application system such that the network SCP recognizes each distributed SCP server as simply an additional parallel processor in the system; and to provide such a system and method which is reliable, economical to implement, which provides distributed custom telephone subscriber services and service creation capabilities to networked SP's with minimal upgrading requirements and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWING

FIG. 7 is an illustration of an initial menu screen of a custom service bulletin board associated with the network SCE and accessible via distributed SP SCE terminals.

FIG. 8 is an illustration of a second menu screen of the custom service bulletin board.

DETAILED DESCRIPTION OF THE INVENTION

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
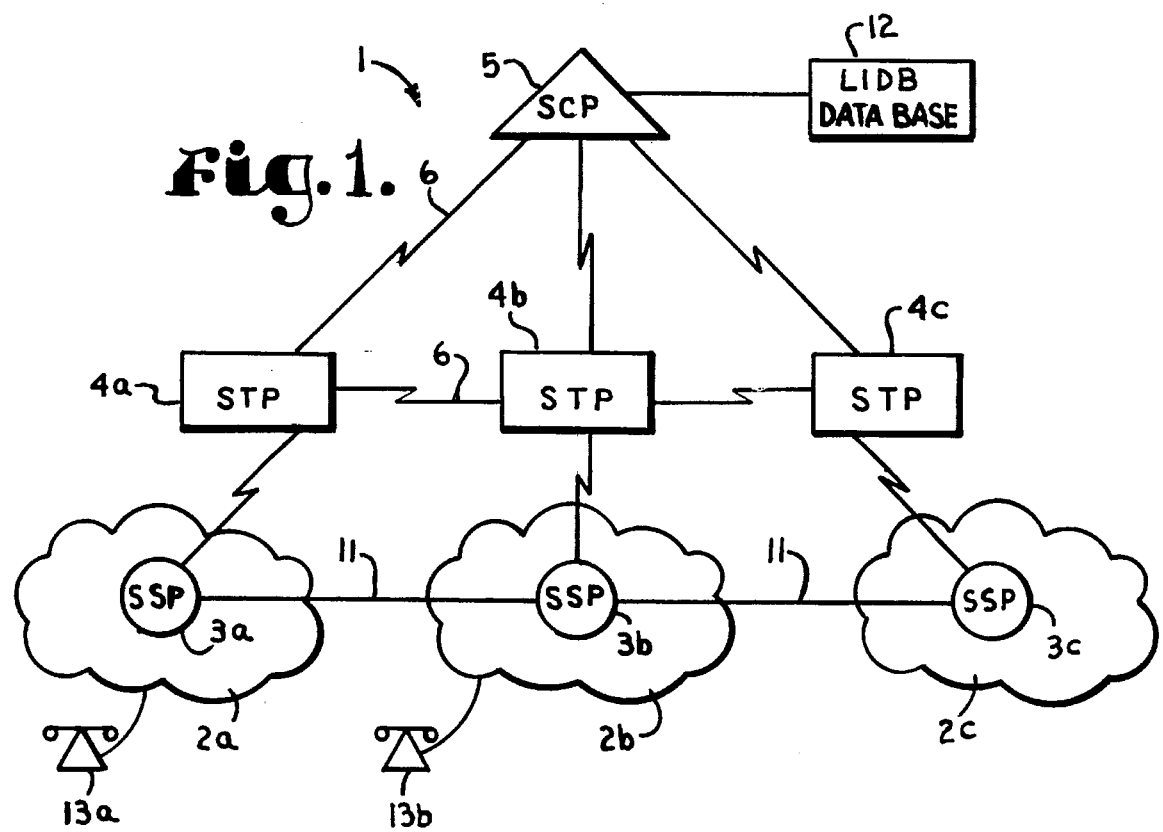
FIG. 1 is a block diagram of a network of Telecommunications service providers (SP's) interconnected into a network LIDB database via a network Service Control Point (SCP).

Referring to the drawings in more detail the reference numeral 1 in FIG. 1 indicates a known network of independent telecommunications service providers, such as independent telephone companies (ITC's) 2a, 2b and 2c, each of which is equipped with an electronic switch with a service switching point (SSP) 3a–3c, respectively. The SSP's 3a–3c are each connected to a signal transfer point (STP) 4a–4c, respectively, with each STP 4a–4c connected to each other and to a network SCP 5 via digital signalling links 6. The SSP's 3a–3c are connected to each other via a voice trunk network 11. The STP's 4 are network identified elements which receive and send digital switching queries in an SS7 ISUP signalling format, and the SCP 5 provides a gateway into a billing (LIDB) database, indicated at 12.

Figure 2:
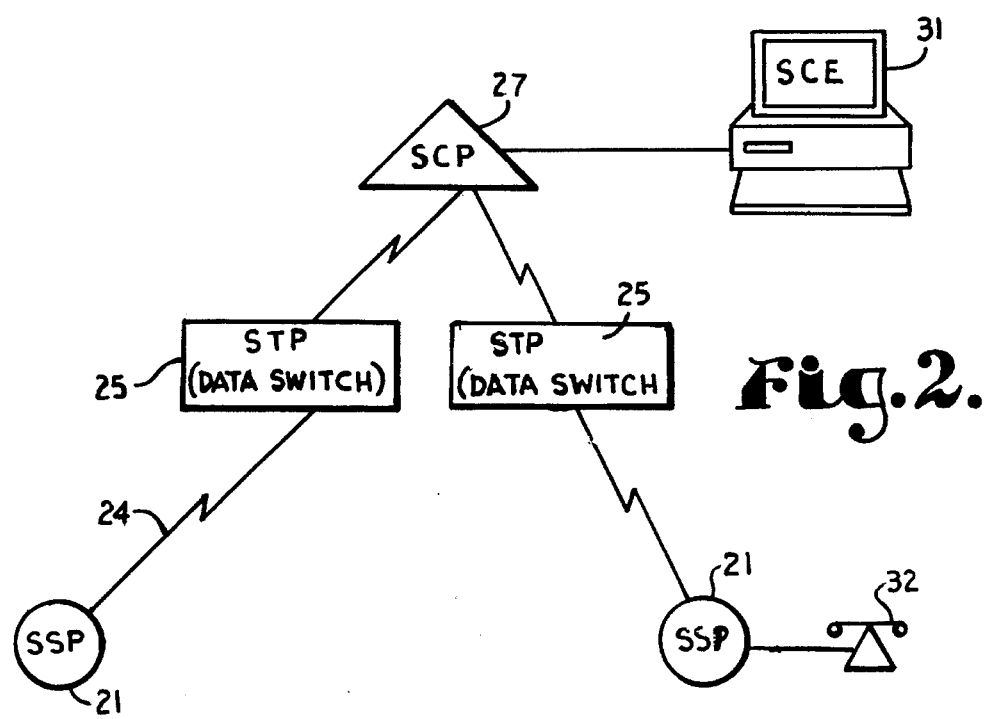
FIG. 2 is a simplified block diagram of an AIN system as implemented by the RBOC's.

Referring to FIG. 2, a simplified representation of an RBOC telephone network with advanced intelligence network (AIN) features is illustrated. A plurality of local office SSP's 21 are connected via digital signalling links 24 to individual STP data switches 25 and the STP's 25 are connected to a network SCP 27. The SCP 27 has associated therewith a Service Creation Environment (SCE) 31.

In operation, the SSP's 21 detect an off-hook condition from a subscriber 32. The SSP 21 detects specific triggers which tells it that a query to the SCP 27 is needed. The trigger could be an immediate off-hook, delayed off-hook, or one of 30 or more other triggering events. Once the SSP 21 detects the trigger, call processing is suspended and an SS7 Transaction Capabilities Application Part (TCAP) signal is sent to the network SCP 27 via the STP 25 and digital signalling links 24. In response, the SCP 27 determines the type of service required, e.g. call forwarding, special announcement, voice mail, etc. and sends a return TCAP message back to the SSP 21 via the STP 25 and digital signalling links 24. The return TCAP message can tell the SSP 21, for example, to switch to a dedicated number for a particular announcement, such as "this number is no longer in service" or the like. With this system, designed as a vertical marketing scheme by the RBOC's, virtually all of the service creation and accessing is done via the network SCP 27 and SCE 31, and the connected services are transparent to the SSP 21. Unfortunately for many smaller ITC's and other telecommunications providers, as stated earlier, to be able to access the special customer services in the network SCP 27, an expensive upgrade to the central office switch is required. An additional disadvantage of the RBOC system from an independent service provider's perspective, is that the independent service provider must relinquish control of its customer database to the RBOC, a potential competitor, for service creation and accessing.

Figure 5:
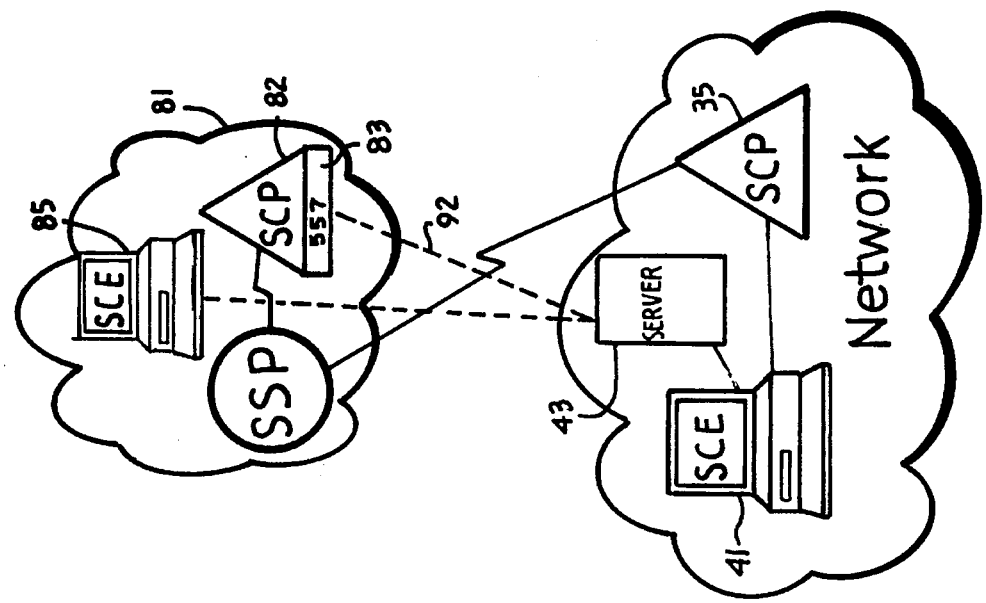
FIG. 5 is a block diagram illustrating an alternative network architecture for interconnecting an SP with a dedicated SCP processor hubbed to a network SCP, with the dedicated SCP processor including an SS7 signalling interface and comprising a network identified element and with a distributed SCE terminal connected to a network SCE file server.
Figure 4:
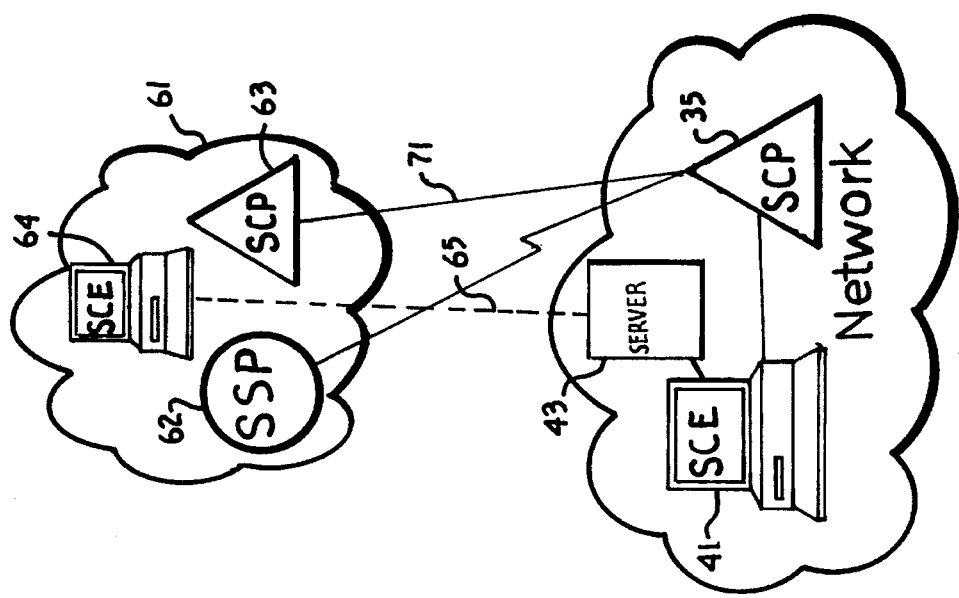
FIG. 4 is a block diagram illustrating network architecture for interconnecting an SP with a dedicated SCP processor hubbed to a network SCP, with the dedicated SCP processor being linked to the network SCP and with a distributed SCE terminal connected to a network SCE file server.
Figure 3:
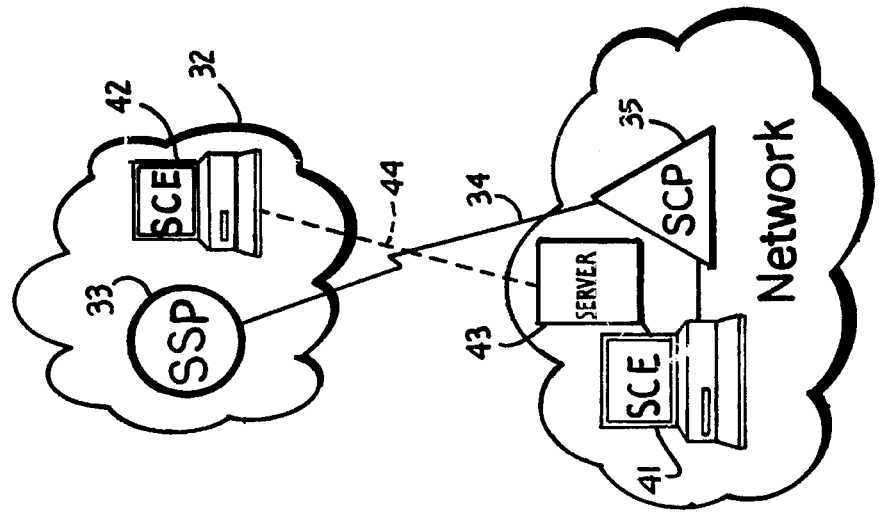
FIG. 3 is a block diagram illustrating network architecture for interconnecting a participating SP to a network SCP with the SP having a distributed SCE terminal connected to a network SCE file server.

Referring to FIGS. 3, 4 and 5, three different options are illustrated for providing AIN type customer services to independent telecommunications service providers within a network, depending upon the needs and capabilities of the particular service provider (SP).

II. Distributed Service Creation Environment

In FIG. 3, an SP 32 is illustrated with a central office switch—SSP 33. A digital signalling link 34 is set up between the SSP 33 and a network SCP 35. The network SCP 35 is connected to an associated network Service Creation Environment (SCE) 41. For purposes of simplification only a single SSP 33 is illustrated and intervening STP data switches are not shown in FIGS. 3–5. In addition, the SP 32 includes an SCE terminal 42. The SCE terminal 42 is connected to a network SCE file server 43 via a data link 44. Thus, the SP 32 can access and create services, or simply load and retrieve subscriber data and services from the network SCE 41. A common computer code and compatible equipment for the SCE terminal 42 is preferably provided by the network, but, in practice, the SCE terminal 42 can be as simple as a 486 processor driven PC.

A plurality of categories of service creation capabilities can be provided to a particular SP 32, depending upon the particular needs of the SP 32. In a first category, the SCE terminal 42 acts as a full extension of the network SCE 41, with the complete and unrestricted ability to create services, access services from the network, view service features, and input and maintain subscriber data information, associated services and pricing information.

In a second, less comprehensive category, participating SCE terminals 42 are connected to the SCE file server 43 via a graphical interface, running an X-Window program, for example. With this capability, a participating SP 32 can select and view various services located at the network service bulletin board, as described below, and can input and maintain subscriber data information, associated services and pricing information. No service creation capabilities are provided in this category.

In a third, and least comprehensive category, participating SCE terminals 42 are run with a VT emulation program and are connected to the SCE file server 43 via a data link only. These SP's 32 can merely input and retrieve data fields from the network SCE 41, thus allowing the input and retrieval of subscriber data information, and associated service identifiers. No access to the network service bulletin board is provided in this category.

In a preferred embodiment of the invention, the SCE file server 43 comprises a SUN workstation or a Silicon Graphics International workstation and the network SCE 41, the file server 43 and the SCE terminals 42 are run on common software such as that developed by Tandem Computers, Inc. and entitled SCE/2000 with extended SCE Supplement with a UNIX platform.

III. Distributed Service Control Points

FIGS. 4 and 5 illustrate a distributed Service Control Point system wherein a network SCP 35, a network SCE 41 and an SCE file server 43 are again provided. A participating SP 61 includes an SSP 62, a distributed SCP 63 and a distributed SCE terminal 64. As in FIG. 3, the SCE terminal 64 is connected to the SCE file server 43 via a non-real time data link 65 to provide service creation and/or access capability to the SP 61. The distributed SCP 63 is linked to the network SCP 35 via a dedicated high speed data link 71. In addition, the distributed SCP 63 and the network SCP 35 are operated with a common operating and application system whereby full SCP redundancy is provided in the event of a malfunction at the SP's distributed SCP 63.

Figure 6:
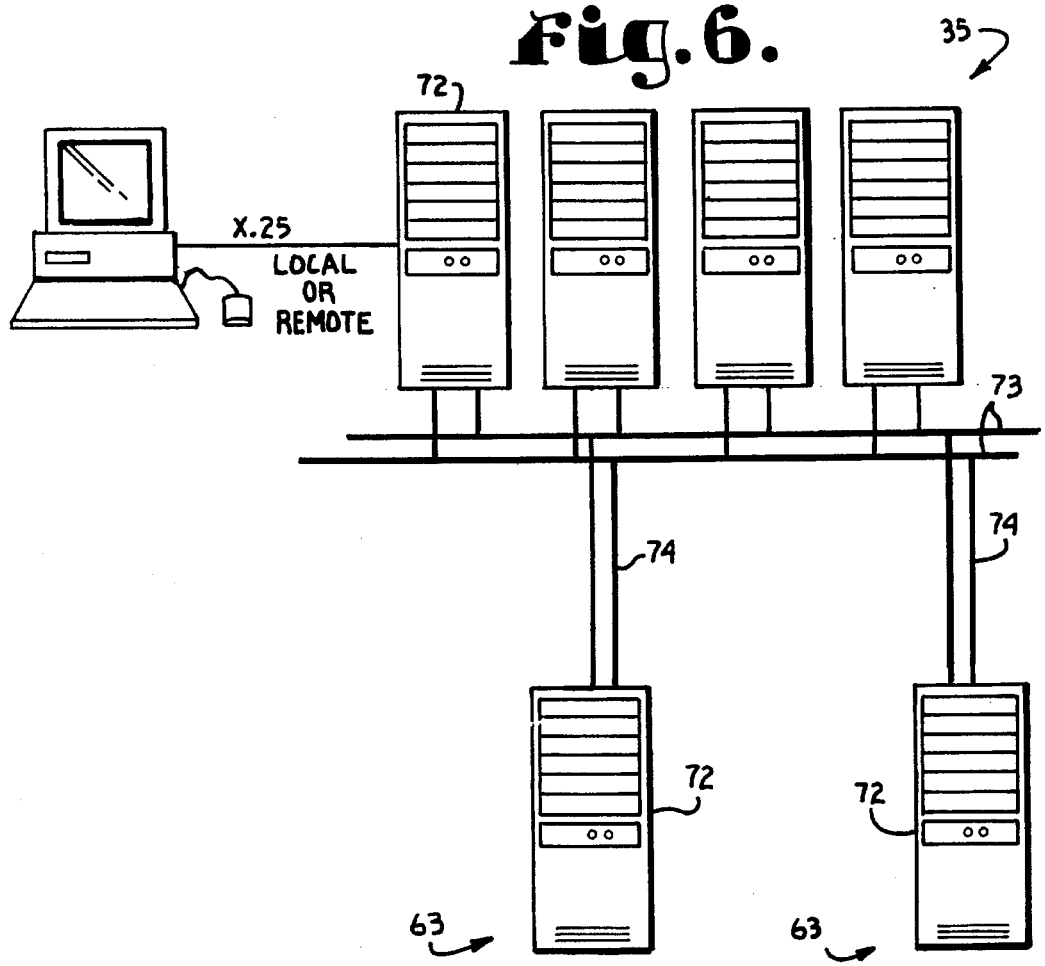
FIG. 6 is a block diagram illustrating a distributed SCP system with a plurality of parallel processors forming the network SCP and with a number of distributed SCP servers linked to the network processors via dedicated high speed busses.

FIG. 6 illustrates one architecture for implementing the distributed SCP network of FIG. 4. The network SCP 35 includes a plurality of processors 72 linked together via dual Local Area Networks (LAN's) 73. The processors 72 can utilize parallel processing software or other similar operating systems which facilitate system growth by allowing virtually unlimited numbers of processors 72 to be linked. The parallel processing option system also provides complete redundancy since the processors 72 share a workload by performing multiple tasks simultaneously. In the event of automatic or manual resubscribed conditions, the network SCP can "back up" or reroute queries to itself or other distributed SCPs. In addition, the processor will be capable of spreading its workload over the remaining processors in case of fault or malfunction.

The distributed SCP's 63 are implemented by using geographically distributed processor servers 72 which are linked to the LAN's 73 via high speed data busses 74. With this architecture, the parallel processors 72 of the network SCP 51 and the distributed processors 72 of the distributed SCP's 63 essentially form plural nodes in a single system without regard to the physical distances between the nodes. With all of the processors 72 running the parallel processing operating system or similar operating systems, complete redundancy is achieved for the distributed SCP's 63.

Finally, FIG. 5 illustrates a third scenario whereby an SP 81 includes a dedicated SCP 82, but one with its own SS7 front end 83. The dedicated SCP 82 is thus a network identified element in its own right and does not require a dedicated link to the network SCP 35. At the same time, however, a distributed SCE terminal 85 is located at the SP 81 and linked to the network SCE 43 in the same fashion as described earlier, thus providing full service creation and access capability to the SP 81. At the same time, the dedicated SCP 82 is linked to the network SCE server 43 via an off-line data link 92 so that service information can be forwarded to the SCP 82 from the network SCE server 43.

IV. Service Bulletin Board

Figure 9:
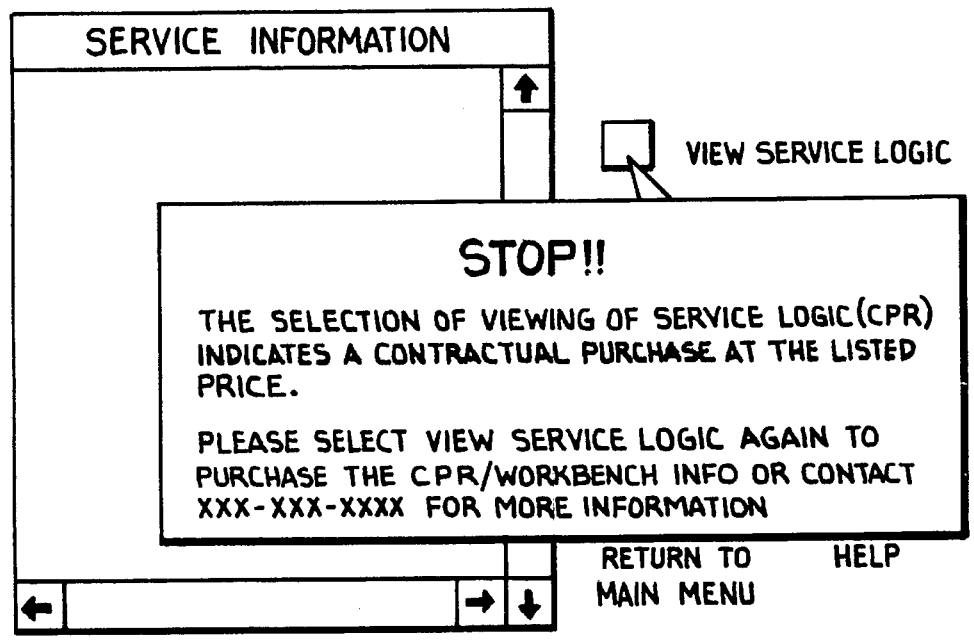
FIG. 9 is an illustration of a third menu screen of the custom service bulletin board.

Referring to FIGS. 7, 8 and 9, one possible version of an SP accessible service bulletin board for a distributed SCE system is illustrated. The network SCE bulletin board will have a function entitled "Services Catalog" or a similar name which can be accessed by any of the distributed SCE's 42, 64, or 85, depending upon their capabilities, via the SCE file server 43. One possible point and click menu is shown in FIG. 7, wherein one of a variety of possible customer service features can be selected. Just as examples, shown in FIG. 7 are Remote Call Forwarding, Repeat Call, Return Call, Selective Call Acceptance, Switched Redirect, etc. Switched Redirect is shown as selected, and a menu of options are displayed as well, including "View Service Definition"; "View Service Logic"; "Customize Service Logic"; "Add New Service to Catalog"; etc. Should a participating SP be interested in one of the displayed services, by selecting "View Service Definition", as illustrated in FIG. 8, the service will be explained, along with additional information, including Average End User profile, associated user groups, target market, customer's willingness to pay, retail price, wholesale price, etc. Thus, a connected SP, provided it has a graphics interface to the network file server 43, can access a specific service and also all of the relevant marketing information associated with the service by simply selecting it from the menu.

The next step, provided the SP is interested in the service, would be to view the actual service logic, but, since this would allow the actual program logic to be reviewed and downloaded, a "Purchase Screen", such as that shown in FIG. 9 can be used to prevent a participating SP from accessing the logic without paying for it.

With the inventive service bulletin board, participating SP's, as well as the network service provider, can post customized services for sale to other SP's. In addition, it is contemplated that third party service vendors could also be given access to the bulletin board for vending custom software service products to the SP's.

The inventive distributed SCP and SCE systems and method can use a variety of protocols or message types, including, without limitation, Transaction Capability Application Part (TCAP); ISDN User Part (ISUP); Cellular Radio Telecommunications Intersystem Intermediate Standard 41 (IS-41); Groupe Speciale Mobile or Global Standard for Mobile Communications (GSM); Common Management Information Protocol (CMIP); and Simple Network management Protocol or standard TCP/IP protocol (SNMP).

It is to be understood that while certain forms of the present invention have been illustrated and described herein, it is not to be limited to the specific forms or arrangement of parts described and shown.

What is claimed and desired to be secured by letters patent is as follows:

1. A method of providing advanced custom telecommunications subscriber services and service creation capabilities to a plurality of Service Providers (SP's) participating in a telecommunications network, wherein the network includes a Service Control Point (network SCP) with a Service Creation Environment (network SCE) associated therewith for creating specialized services, said method comprising the steps of:

a. distributing different types of SCE terminals to selected SP's in the network;
   b. connecting said SCE terminals with said network SCE via a common file server to form a distributed SCE system; and
   c. allowing each SCE terminal access to said network SCE via said file server to participate in accessing and creating said advanced custom services or to load and retrieve service data.

2. A method as in claim 1, and further comprising the steps of:

d. creating a bulletin board of custom services at the network SCE; and
   e. allowing at least some of said SP's to access said bulletin board.

3. A method as in claim 2, wherein said creating step d. includes permitting SP's to selectively upload custom services from their SCE terminals into said bulletin board.

4. A method as in claim 2, wherein said allowing step e. includes permitting SP's to selectively download custom services from said bulletin board into their respective SCE terminals.

5. A method as in claim 2, wherein said different SCE terminal types are divided according to capabilities and said distributing step a. includes providing a selected SCE terminal type for each SP depending upon the service capabilities needed by that SP.

6. A method as in claim 5, wherein said SCE terminal types include:

a. a full extension, wherein each SCE terminal acts as an extension of the network SCE, allowing the creation of custom services or the selective downloading of any service in said bulletin board;
   b. a graphics interface type in which features of services on said bulletin board can be selectively viewed at the SCE terminal and service data can be loaded and retrieved from the network SCE; and
   c. a data field only type in which data fields only can be loaded into and retrieved from the network SCE via the SCE terminal.

7. A method of providing advanced custom telecommunications subscriber services and service creation capabilities to a plurality of Service Providers (SP's) participating in a telecommunications network, said network having a network Service Control Point (network SCP) and a network Service Creation Environment (network SCE) associated therewith, and at least some of said SP's having their own separate geographically distributed Service Control Point (distributed SCP), said method comprising the steps of:

a. providing the network SCP and each separate geographically distributed SCP with a common operating and application system;
   b. connecting each distributed SCP to the network SCP via a signalling link so as to provide call processing information, network redundancy and monitoring for the distributed SCP's;
   c. providing separate different types of SCE terminals distributed at selected certain SP's in the network;
   d. connecting each separate distributed SCE terminal with said network SCE via a common file server to form a distributed service creation system; and
   e. allowing each SCE terminal access to said network SCE via said file Server to participate in accessing and creating said advanced custom services or to load and retrieve service data.

8. A method as in claim 7, and further comprising the steps of:

f. creating a bulletin board of custom services at the network SCE; and
   g. allowing each separate distributed SCE terminal access to said bulletin board.

9. A method as in claim 8, wherein said creating step f. includes permitting SP's to selectively upload custom services from their separate distributed SCE terminals into said bulletin board.

10. A method as in claim 8, wherein said allowing step g. includes permitting SP's to selectively download custom services from said bulletin board into their respective separate distributed SCE terminals.

11. A method as in claim 7, wherein the network SCP comprises a plurality of processors and each separate geographically distributed SCP comprises a scalable server compatible with said processors, said connecting step b. comprising connecting each separate geographically distributed SCP server to the network SCP via a high speed bus such that the network SCP and the distributed SCP servers are interconnected with a parallel system architecture so as to form an expanded parallel processor.

12. A method as in claim 11, wherein said providing step c. includes operating each separate geographically distributed SCP server and the network SCP via a common operating system for relaying call processing information, full redundancy and enhanced system reliability.

13. In a telephone network comprising a plurality of telecommunications Service providers (SP's) connected to a network Service Control Point (SCP) via out of band signalling links, the improvement comprising a distributed custom service system including:

a. a service database associated with said network SCP, said service database including a plurality of subscriber identification numbers and a corresponding plurality of associated services;
   b. a Service Creation Environment (SCE) associated with said network SCP for creating and altering services and assigning services to specific subscriber identification numbers in said database; and
   c. a distributed SCE network including a plurality of different types of SCE terminals associated with corresponding ones of at least some of said SP's, said SCE terminals being connected to said network SCE through a network SCE file server such that individual SP's can control their own service requirements and can maintain their own subscriber service databases.

14. The improvement of claim 13, and further comprising a bulletin board of custom services at the network SCE whereby at least some of said SCE terminals have selective access to said service bulletin board via said SCE file server.

15. The improvement of claim 14, and further comprising uploading means for permitting selected SP's to upload custom services from their SCE terminals into said bulletin board.

16. The improvement of claim 14, and further comprising downloading means for permitting SP's to access and selectively download custom services from said bulletin board into their SCE terminals.

17. The improvement of claim 14, wherein there are a plurality of types of SCE terminals divided according to capabilities, said types including:
   a. a full extension type wherein each service creation terminal acts as an extension of the network SCE, allowing the creation of custom services or the selective downloading of any service in said bulletin board;
   b. a graphics interface type in which each SCE terminal can selectively view features of services on said bulletin board; and
   c. a data field only type in which each SCE terminal can load and retrieve data fields into and from, respectively, the network SCE.

18. In a network of participating telecommunications Service Providers (SP's), said network having at least one Service Control Point (network SCP), at least some of said SP's including a separate dedicated Service Control Point (distributed SCP), the improvement comprising:
   a. a common operating and application system for both the network SCP and each distributed SCP;
   b. one or more signalling links connecting each distributed SCP with said network SCP so as to provide call processing information, network redundancy and monitoring for the distributed SCP's;
   c. a distributed Service Creation Environment including:
      (i.) a network Service Creation Environment (network SCE);
      (ii.) separate different types of SCE terminals distributed at certain SP's in the network; and
      (iii.) a network file server connecting each of said separate distributed SCE terminals with said network SCE to provide service creation or to load and retrieve service data to and from said certain SP's.

19. The improvement of claim 18, and further comprising:
   d. a bulletin board of custom services at the network SCE; and
   e. means for providing each separate distributed SCE terminal access to said bulletin board.

20. The improvement of claim 18, and further comprising means for permitting SP's to selectively upload custom services from their SCE terminals into said bulletin board.

21. The improvement of claim 18, and further comprising means for permitting SP's to selectively download custom services from said bulletin board to their SCE terminals.

22. The improvement of claim 18, wherein:
   a. the network SCP comprises a plurality of parallel processors and each distributed SCP comprises a scalable server compatible with said parallel processors; and
   b. said high speed signalling links comprise high speed busses such that the network SCP and the distributed SCP server's are interconnected with a parallel system architecture to form an expanded parallel processor.

23. The improvement of claim 22, wherein said common operating and application system operates such that a fault in any of the interconnected processors or servers causes the remaining processors or servers to assume the processing load of the faulting processor or server for full redundancy and enhanced system reliability.

24. The improvement of claim 22, wherein said common operating and application system operates such that in the event of automatic or manual resubscribed conditions, the network SCP can reroute queries to itself or other distributed SCP's.

25. In a network of participating telecommunications Service Providers (SP's), said network having at least one Service Control Point (network SCP) and a Service Creation Environment (network SCE) associated therewith, the improvement comprising a distributed service creation environment including:
   a. separate different types of SCE terminals distributed at certain SP's in the network; and
   b. a network file server connecting each of said separate distributed SCE terminals with said network SCE to provide service creation or to load and retrieve service data to and from said certain SP's.

26. The improvement of claim 25, and further comprising:
   c. a bulletin board of custom services at the network SCE; and
   d. means for providing each separate distributed SCE terminal access to said bulletin board.

27. The improvement of claim 26, and further comprising means for permitting SP's to selectively upload custom services from their SCE terminals into said bulletin board.

28. The improvement of claim 26, and further comprising means for permitting SP's to selectively download custom services from said bulletin board to their SCE terminals.

29. A method of providing advanced custom telecommunications subscriber services and service creation capabilities to a plurality of Service Providers (SP's) participating in a telecommunications network, wherein the network includes a Service Control Point (network SCP) with a Service Creation Environment (network SCE) associated therewith for creating specialized services, said method comprising the steps of:
   a. providing different types of SCE terminals distributed at corresponding SP's in the network;
   b. connecting said SCE terminals with said network SCE via a common file server to form a distributed SCE system.
   c. creating a bulletin board of custom services at the network SCE; and
   d. allowing at least some of said SP's to access said service bulletin board via said file server.

30. A method as in claim 29, wherein said creating step includes permitting SP's to selectively upload custom services from their SCE terminals into said bulletin board.

31. A method as in claim 29, wherein said allowing step includes permitting SP's to selectively download custom services from said bulletin board into their respective SCE terminals.

32. A method as in claim 29, wherein there are a plurality of SCE terminal types divided according to capabilities and said providing step includes providing a selected SCE terminal type for each SP depending upon the service capabilities needed by that SP.

33. A method as in claim 32, wherein said types include:
   a. a full extension type wherein each SCE terminal acts as an extension of the network SCE, allowing the creation of custom services or the selective downloading of any service in said bulletin board;
   b. a graphics interface type in which features of services on said bulletin board can be selectively viewed at the SCE terminal and service data can be loaded and retrieved from the network SCE; and c. a data field only type in which data fields only can be loaded into and retrieved from the network SCE via the SCE terminal.

34. In a telephone network comprising a plurality of telecommunications Service providers (SP's) connected to a network Service Control Point (network SCP) via out of band signalling links, the improvement comprising a distributed custom service system including:
  a. a service database associated with said network SCP, said service database including a plurality of subscriber identification numbers and a corresponding plurality of associated services;
  b. a Service Creation Environment (network SCE) associated with said network SCP for creating and altering services and assigning services to specific subscriber identification numbers in said database;
  c. a distributed SCE network including different types of SCE terminals associated with respective ones of at least some of said SP's, said SCE terminals being connected to said network SCE through a network SCE file server such that individual SP's can control their own service requirements and can maintain their own subscriber service databases; and
  d. a bulletin board of custom services at the network SCE whereby at least some of said SCE terminals have selective access to said service bulletin board via said SCE file server.

35. The improvement of claim 34, and further comprising uploading means for permitting selected SP's to upload custom services from their SCE terminals into said bulletin board.

36. The improvement of claim 34, and further comprising downloading means for permitting SP's to access and selectively download custom services from said bulletin board into their SCE terminals.

* * * * *